United States Patent [19]
Reynolds et al.

[11] 3,841,556
[45] Oct. 15, 1974

[54] ROADBED ON WHICH ELECTRICALLY POWERED VEHICLES CAN BE OPERATED

[76] Inventors: Robert J. Reynolds, 1543 Pine Valley, Ann Arbor, Mich. 48104; Herman F. Deyerl, P.O. Box 3721, Santa Monica, Calif. 90403

[22] Filed: Feb. 14, 1973

[21] Appl. No.: 332,309

Related U.S. Application Data

[62] Division of Ser. No. 184,105, Sept. 27, 1971, Pat. No. 3,736,484.

[52] U.S. Cl............ 238/10 E, 46/1 K, 104/148 LM, 191/2
[51] Int. Cl............................................ A63h 18/12
[58] Field of Search................ 238/10 A–10 E, 238/10 F; 104/60, 148 LA, 149; 46/1 K; 191/22, 2

[56] References Cited
UNITED STATES PATENTS

| 2,717,557 | 9/1955 | Seyffer | 104/149 |
| 2,872,879 | 2/1959 | Vierling | 104/149 |
| 2,965,044 | 12/1960 | Johnson, Jr. | 104/149 |
| 3,288,368 | 11/1966 | Athearn | 238/10 F |
| 3,460,287 | 8/1969 | Arnow | 104/119 |
| 3,729,133 | 4/1973 | Covert | 238/10 E |

Primary Examiner—M. Henson Wood, Jr.
Assistant Examiner—Richard A. Bertsch
Attorney, Agent, or Firm—Olsen and Stephenson

[57] ABSTRACT

A system for controlling wheeled vehicles on a track. The system provides for simultaneous remote control of a number of vehicles which receive both power and control signals from conducting elements on a track so configured as to receive the signals from a remote controller. The system allows unlimited steerability of the vehicles, continuous and smooth speed control, and dynamic braking and reversing of the vehicles. A roadbed for use in the system is disclosed.

3 Claims, 20 Drawing Figures

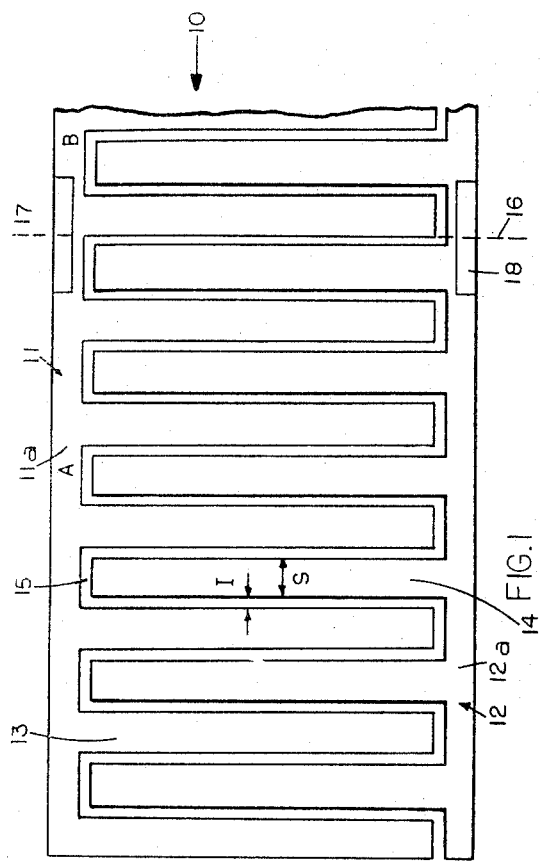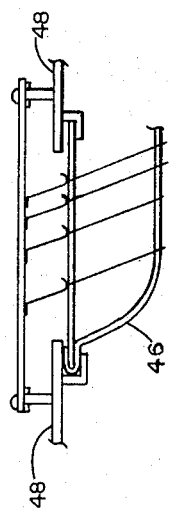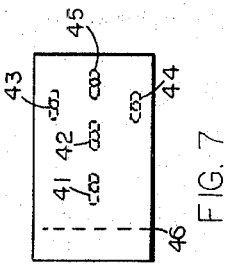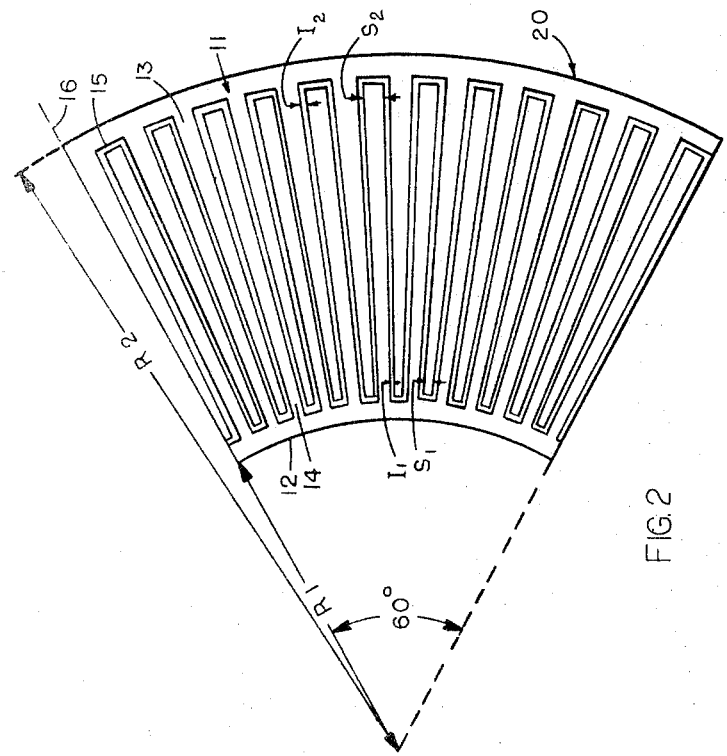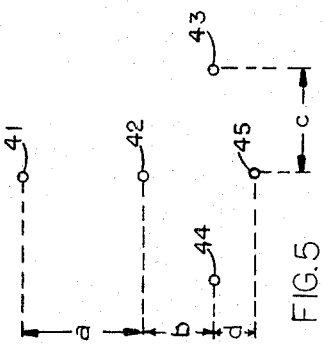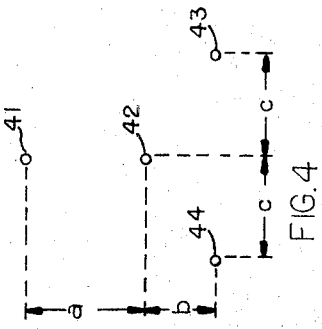

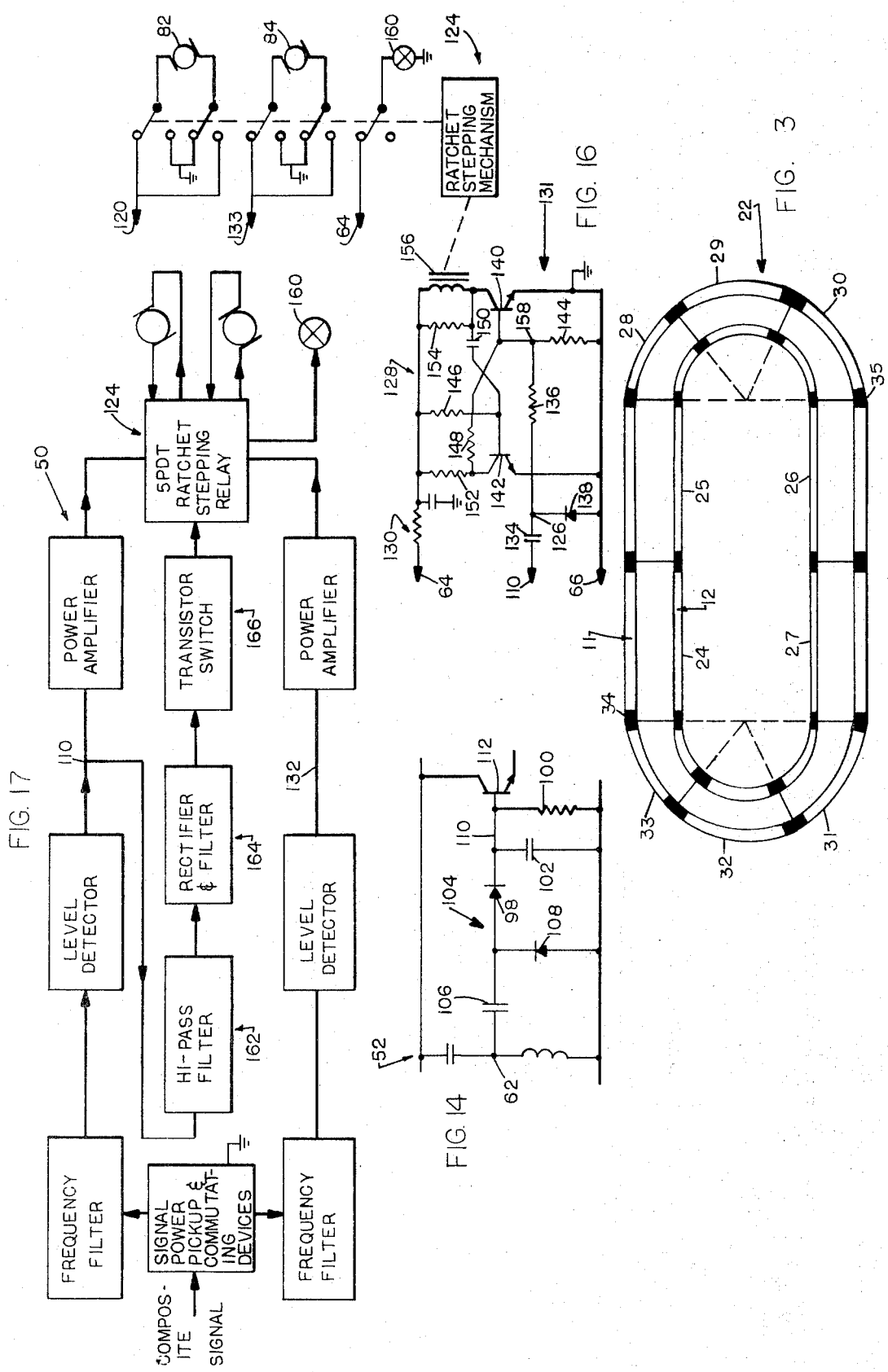

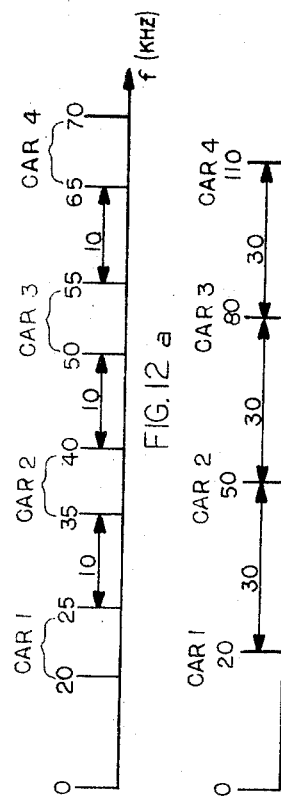
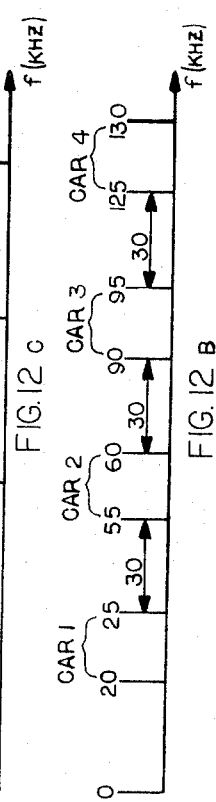
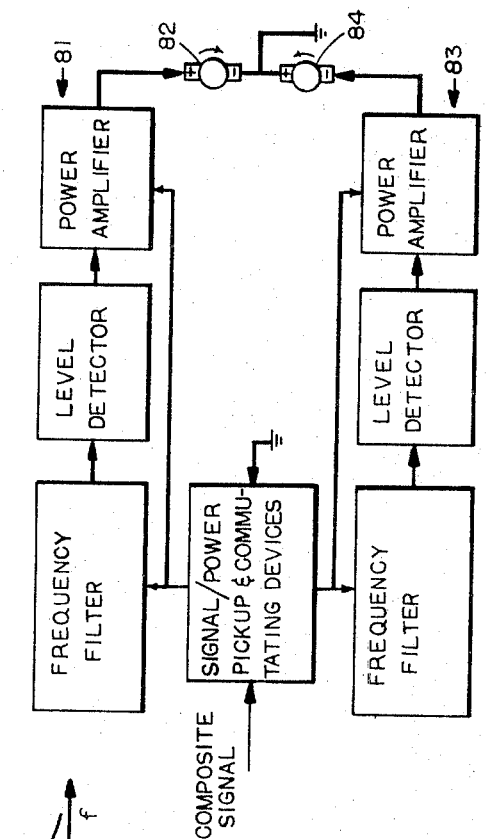
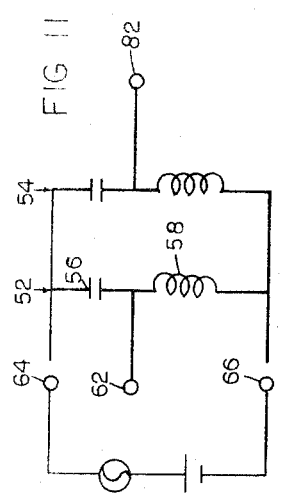
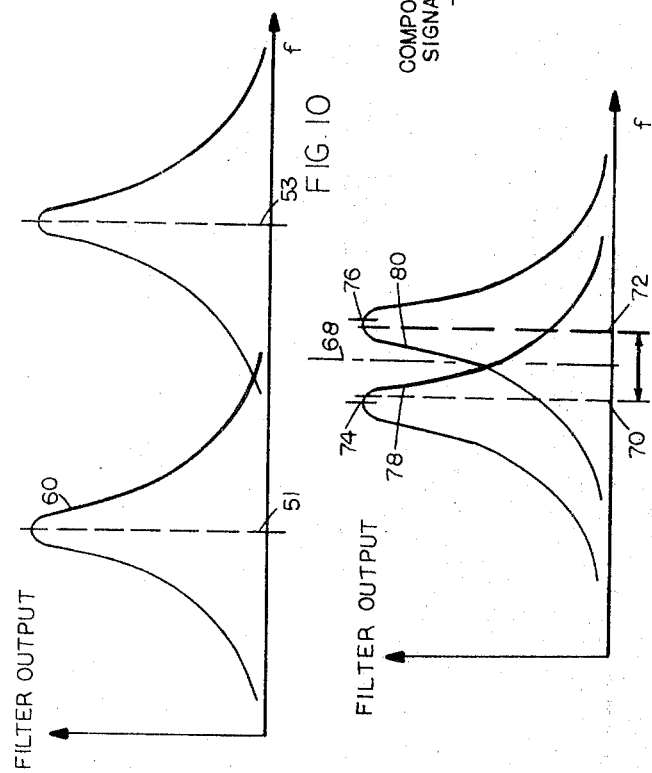

3,841,556

ROADBED ON WHICH ELECTRICALLY POWERED VEHICLES CAN BE OPERATED

REFERENCE TO RELATED APPLICATION

This is a divisional application of application Ser. No. 184,105, filed Sept. 27, 1971 entitled "A System for Operating Electrically Powered Vehicles on a Roadbed", now U.S. Pat. No. 3,736,484.

BACKGROUND OF THE INVENTION

The present invention relates to improvements in a roadbed for electrically powered toy vehicles adapted for travel on the roadbed.

Remotely controlled toy cars have been previously known. Former systems have been generally of two types. The first type conventionally employed a slot, groove or other similar steering device which constrained the car to a fixed path with speed control being the only function remotely controllable. The second type provided for remote control of both steering and speed. Some systems in this second group require the use of a battery in the vehicle for propelling power while control is performed remotely. Other systems that supply both power and control from a remote source of supply to a track have failed to operate satisfactorily for various reasons, and the present invention is directed toward overcoming the shortcomings of such other systems.

One such system is disclosed in U.S. Pat. No. 3,205,618 to Heytow, which shows an integrated system for control of speed and steering as well as providing power externally to the vehicle. Systems of this type suffer drawbacks in operation relating to unlimited steerability, the number of vehicles that may be operated simultaneously, and continuous essentially linear speed control. The present invention overcomes these problems while providing a system that is realistic in play-action and performance and practical in terms of manufacture, and in particular provides an improved roadbed for use in the system.

SUMMARY OF THE INVENTION

The invention includes a roadbed capable of receiving superimposed A.C. or D.C. signals from an external controller, which can be used in combination with a wheeled vehicle of the type disclosed in U.S. Pat. No. 3,590,526, issued July 6, 1971 for "Remotely Steerable Vehicle," that in turn receives power and control signals from the track through a minimum number of contacts, has circuitry to receive, detect and respond to those signals, and has electro-mechanical transducers, generally D.C. motors, to propel and steer the vehicle.

The roadbed may have one of several shapes; for example, that of a one-piece rectangular surface. However, a roadbed in the form of a track approximately oval shaped is the most familiar course employed for the competitive racing of more than one vehicle. There are two types of sections from which the track is formed, a straight section and a curved section. In reference to the conductive track surface, a preferred design permits the interchange of, respectively, any straight sections and any curved sections, which facilitates the assembly of the track. The contacts on the vehicle are geometrically spaced so that a minimum number will assure that at least two will be contacting opposite polarity conducting segments on the track for all orientations of the vehicle. The spacing of flexible contacts may be accurately maintained with a special guard device. The circuitry allows for the reception of either constant frequency or variable frequency control signals. Its action provides for the minimization of "cross-talk" and for compression of the dynamic range of the remote signal source because of the loading of that source by the receiving circuitry, both effects facilitating the simultaneous independent operation of several vehicles on a common roadbed. Smooth and precise control of the vehicles is made possible through the provision of a minimum resistive load for the commutating diodes which are part of the receiving circuitry in the vehicles, and by arranging the circuitry in such a way as to utilize the inherent self-regulating characteristics of the drive motors.

Thus, it is among the objects of the present invention to provide improvements in a roadbed on which electrically powered vehicles can be operated.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a fragmentary plan view showing a straight section of the track embodying a portion of the present invention;

FIG. 2 is a plan view of a curved section of the track;

FIG. 3 is a plan view in reduced scale of a composite track comprising ten sections (with details of sections excluded);

FIG. 4 illustrates schematically a four contact pickup arrangement of the vehicle that can be used on a straight track section;

FIG. 5 illustrates schematically a five contact pickup arrangement of the vehicle for use on both curved and straight track sections;

FIG. 6 is a fragmentary side elevational view of the contact guard in its mounted position on the vehicle;

FIG. 7 is a top plan view of the contact guard that is part of a vehicle employing five contacts;

FIG. 9 is a block diagram of the basic receiving circuitry in the vehicle;

FIG. 10 is a graph showing the approximate frequency response curves of the frequency filters and their separation with respect to frequency in the case of constant frequency control of the vehicles;

FIG. 11 is a schematic diagram of the series resonant filters used in the basic receiving circuit;

FIG. 12a is a diagram showing a theoretically possible assignment of control frequencies for constant frequency control;

FIG. 12b is a diagram showing a practical assignment of control frequencies adapted for constant frequency control;

FIG. 12c is a diagram showing a practical assignment of control frequencies for variable frequency control;

FIG. 13 is a frequency graph showing the approximate frequency response curves of the slope detectors and their separation with respect to frequency in the case of variable frequency control of the vehicles;

FIG. 14 is a schematic diagram of an alternate detector circuit, a voltage doubler, for use in the basic receiving circuit;

FIG. 16 is a schematic diagram of the pulse modulation circuit modification used for braking and reversing the vehicle;

FIG. 17 is a block diagram showing another circuit modification for the basic receiving circuit to provide braking and reversing of the vehicle using an amplitude modulation method.

DESCRIPTION OF THE PREFERRED EMBODIMENTS

Figure 15:
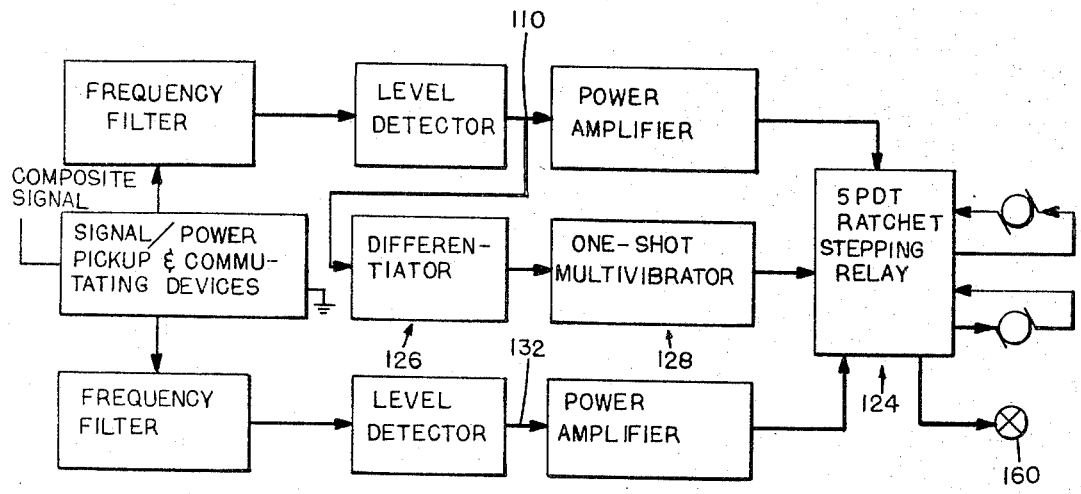
FIG. 15 is a block diagram showing a circuit modification for the basic receiving circuit to provide braking and reversing of the vehicles using a pulse modulation method.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring first to FIGS. 1-3, a brief description of the track which forms the roadbed will be given. With reference to FIG. 1, a straight section of the track, generally at 10, shows the configuration of conductors 11 and 12. Each conductor is a solid, continuous piece of conducting material formed into uniform segments 13 and 14 extending respectively perpendicular from common conductor busses 11a and 12a. The perpendicular conducting segments 13 and 14 are alternated so that a vehicle traveling parallel to the common busses 11a and 12a and perpendicular to the conducting segments 13 and 14 would encounter first conductor 11 and then conductor 12 and so forth. The space between the conductors 11 and 12 consists of an insulator 15.

Where two sections are joined at a line 16 (FIG. 1), clamps 17 and 18 hold the two sections physically together and provide electrical contact between conductors 11 of sections A and B and conductors 12 of sections A and B.

With reference to FIG. 2, a curved section 20 of the track shows the configuration of the conductors 11 and 12 and interposed insulator 15. The conducting segments 13 and 14 of each conductor 11 and 12 extending radially, vary proportionally in width as the radial distance increases. The section 20 is dimensioned so that it can be joined to a straight section or another curved section at line 16 with clamps 17 and 18, for example, similar to the connection used between straight sections 10.

With reference to FIGS. 1 and 2, in the preferred configuration of the straight and curved track sections, the sections are so dimensioned that the last conductor at one end is a segment 13 and at the opposite end a segment 14. Further, the track sections are terminated exactly along the edge of the conductor segment at one end and along the edge of an insulator 15 at the opposite end. In this way, a uniform, nearly perfect transition with respect to the conductor/insulator pattern obtains where adjoining track sections mate.

With reference to FIG. 3, one possible configuration of a track 22 using curved sections 28–33 and straight sections 24–27 is shown. The track 22 forms a closed roadbed. In this configuration conductors 11 and 12 are essentially circular, and electrical current introduced to the track at a point 34 has two parallel paths to travel in conductor 11, one clockwise and one counterclockwise to reach point 35. Since a conductor has a characteristic voltage drop dependent on its length, the closed conductor configuration assures that current travels a maximum of only one half the length of a closed track's configuration in order to reach the farthest point from the input at which a vehicle may be located. This minimizes the characteristic voltage drop and helps maintain accurate vehicle control regardless of the vehicle's position on the track with respect to the input.

The pattern of the conducting segments 13 and 14 and the insulator 15 determines the number and the geometric arrangement required for the electrical contacts mounted on the vehicle (not shown) employed to pick up the electrical signals from the track. In order that there be a continuous flow of current from track conductors 11 and 12 to the vehicle's circuitry, there must be at least one contact in engagement respectively with each of conducting segments 13 and 14.

To obtain optimum performance of the vehicles on the track it is found that certain configurations or arrangements of the contacts on the vehicle are necessary, and procedures that may be followed for arriving at desirable patterns will next be explained. FIGS. 4 and 5 show schematically two such contact pickup configurations, with contacts 41–44 representing a four-pickup pattern in FIG. 4 and contacts 41–45 representing a five-pickup pattern in FIG. 5. Dimensions $a$, $b$, $c$ and $d$ indicate the proper spacing. Referring back to FIG. 1 dimensions I and S represent the width of insulation and conducting segments respectively.

Referring to FIG. 2, dimension $R_1$ represents the inside radius of the curved track section 20 and $R_2$ the outside radius of the curved track section 20 respectively. $S_1$ and $I_1$ represent the width of the conducting segment and insulator respectively near the inside diameter, and $S_2$ and $I_2$ represent the width of the conductor segment and insulator respectively near the outside diameter of the track. Spacing of contacts is achieved by first considering the rectangular track section 10 of FIG. 1. It is found that a practical four-pickup pattern, FIG. 4, can be specified as follows:

either $a > b$ or $b > a$,
and $a + b > S + 2 I$;
also $(S + 2 I) < 2 c < (2 S + I)$.

The exact dimension of $2c$ depends on the respective dimensions of $a$ and $b$ and is chosen such that if any one pickup is held in place on any spot of any insulator, e.g., by means of a pin (the "pin test"), and the pickup pattern is revolved 360° around that point (a rotation of only 180° is required in the case of pickups 41 and 42, and it is sufficient to test only one of pickups 43 and 44, because of symmetry), then there must always be at least two pickups contacting segments of opposite polarity. As was already implied, this test must be applied to pickups 41 and 42 and 43 or 44. Any one of several patterns that satisfies this requirement will be a usable one. (The exact dimensions of the several patterns can be specified mathematically, by geometric relationships).

In the case of track sections having curved boundaries 20, the pattern of parallel transverse segments of constant width must be modified if the transverse segment orientation is to be maintained over the surface of the curved sections 20. With a conductive segment pattern as in FIG. 2, there is a considerable variation in segment width from the inside boundary (radius $R_1$) to the outside boundary (radius $R_2$), because of the relatively small radii involved in a track of conventional size. Because of this varying segment width, the four-pickup arrangement in FIG. 4 would not serve to meet the requirement for continuous current flow defined previously, nor would any other arrangement of four pickups. The addition of a fifth pickup will make possible a pickup arrangement that will meet the requirement everywhere, on the straight as well as the curved sections.

As in the case of the four-pickup arrangement, a symmetrical distribution of the brushes is also the most logical one for the five-pickup arrangement. The fifth pickup 45 is placed on the line of symmetry, below the base line of the isosceles triangle formed by the contacts 42, 43 and 44 as shown in FIG. 5. In regard to dimensioning of the spacing of the pickups, similar considerations apply as those specified for the case of the four-pickup arrangement. It happens, however, that the spacing involved with travel on the radial strip surface is much more critical than that on the parallel segment surface because of the variation in width from one end of the segment to the other: ratios of these widths on the order of 2:1 and larger (depending on the radii of the curved boundaries) may obtain. It is apparent that a comprehensive mathematical formulation for the pickup spacing is much more involved here than in the case of a parallel segment pattern.

In determining a usable five-pickup arrangement, one can at once specify the dimension $2c$ as follows:

a. If the line of symmetry of the pickup pattern is moved along an insulator towards the inner boundary, then the relationship $$2c < (2 S_1 + I_1)$$

must obtain, where $S_1$ is the inner usable segment width and $I_1$ the insulator width at that point.
b. If the pattern is similarly moved to the outer boundary, but aligned with the radial bisector of any segment, then the relationship $$2c > (S_2 + 2 I_2)$$

must obtain, where $S_2$ and $I_2$ are analogously defined as $S_1$ and $I_1$. The dimension $2c$, and thus the position of pickups 43 and 44 has been established.

It is possible to determine the spacings $a$ and $b$ for tangential travel at the center of the track (at a distance $(R_1 + R_2)/2$, with reference to FIG. 2). The relationships for $a$ and $b$, as well as the pin test, can be applied to select $a$ and $b$. It will be found that with the four pickups positioned thus far, tangential travel near the outside boundary will present no contact problem. Tangential travel near the inside boundary, however, may give rise to marginal situations; and the fifth pickup 45 is provided which will remedy this situation.

The fifth pickup 45 will not only alleviate the problems cited above but if properly placed it will supplement the four other pickups so that the general criterion for continuous current flow is met. The dimension $d$ can be determined experimentally, for example, as follows: The pickups 41 through 44 are appropriately marked on translucent "graph paper" whose dimensions are that of the car chassis, which is laid over a segment pattern drawing of actual size. Starting at one boundary and successively working (radially) towards the opposite boundary, the pin test is applied and pickup 45 is positioned such that the pickup arrangement will meet the continuous current flow requirement.

For optimum operation, it is essential that proper spacing of contacts 41, 42, 43, 44 and 45 is maintained at all times. A contact guard 46, shown in FIGS. 6 and 7, may be provided which will maintain the spacing of flexibly suspended contacts regardless of the movement of the contacts relative to the track surface. The guard is constructed of insulating material extending below the vehicle's frame 48 and having holes therein corresponding to the spacing of the contacts 41, 42, 43, 44 and 45. The guard allows the contacts to protrude slightly to contact the track while at the same time constraining the contacts to the specified five-contact configuration. The guard 46 also serves to prevent damage to contacts during handling of the vehicle off of the track.

With reference to FIGS. 8–12, the basic control circuitry of the vehicle will be described. The vehicle's receiving circuitry generally shown in FIG. 8 at 50 is shown in functional block diagrams in FIG. 9. In the preferred embodiment, the receiving circuitry consists of two channels, each furnishing a remotely controllable output voltage that drives a transducer such as an electric motor. The circuit channels are electrically independent from one another, but their combined actions effect simultaneous speed and steering control. The receiving circuitry may be made responsive to either a pair of control signals, each of which with fixed frequency and modulated in amplitude, or to a single control signal which is modulated in frequency as well as in amplitude. The former case is referred to as constant frequency operation, the latter as variable frequency operation.

In constant frequency operation, each control function has a predetermined frequency 51 and 53 shown in FIG. 10 provided by an external controller (not shown). The receiving circuit 50 has two series resonant filters shown at 52 and 54 in FIG. 8 and shown enlarged in FIG. 11. Each filter is similar to filter 52 which has a capacitor 56 and inductor 58 selected in value to resonate at the predetermined frequency 51, for example, and has a characteristic response curve approximately as in 60. Signals of the frequency 51 are present at the filter's output 62 with maximum amplitude, the voltage across the inductor 58 attaining many times the amplitude of that of the signal across input terminals 64 and 66. Signals at the input having frequencies other than the center frequency 51 are attenuated, relative to the center frequency, according to the frequency-voltage relationship prescribed by the filter response curve 60. Variations, due to modulation, of the input signal amplitude will be present in the output voltage at 62 and are utilized, after detection and suitable amplification, to drive the transducer 82 at the output 120 of channel 81.

A similar output of frequency 53 is obtained, at 82, from the filter 54. This signal is processed in channel 83 and drives transducer 84. The simultaneous actions of transducers 82 and 84 effect steering and speed control of the vehicle.

The use of series-resonant frequency filters 52 and 54 provides, in addition to the voltage gain cited above, the following advantages not readily obtainable with other types of filters of comparable simplicity: (a) Loading of the external driving source by the low impedance of each filter at its resonant frequency compresses the dynamic signal range. In consequence, for a given maximum dynamic range, many more control frequencies can be simultaneously employed, that is, superimposed in the driving source, making possible the simultaneous operation of several vehicles. (b) The source loading minimizes cross-coupling of any given control signal into nonassociated frequency filters, thereby minimizing interference to the operation of individual circuit channels. (c) The source loading results in relatively small A.C. signal excursions superposed on the direct voltage at branch 94 that supplies the transistor collector currents, obviating the need for A.C. filtering in that branch. (d) The source loading and restriction of dynamic signal range tend to minimize spurious radiation of the control signals by the conductors comprising the feedwires to the track and the conductive track elements. (e) The series-connected L-C filters make possible the simplest method of separating the D.C. component from the control signals at node 90, if the output is taken across the inductive element 58 as in FIG. 11.

FIGS. 12a and 12b show the frequency range assignment for constant frequency operation where four vehicles or cars are to be controlled. The frequencies 51 and 53 are separated by 5 khz for example. FIG. 12a shows an impractical assignment. Since the higher frequency assigned to car 2 is 40 khz, it is the second harmonic of the lower frequency 20 khz assigned to car 1, and there may be sufficient power in the second harmonic of the 20 khz signal to interfere with car 2's performance. FIG. 12b shows a practical assignment having the pairs of frequencies spaced at 30 khz intervals to avoid the problem of interference by control signal harmonics.

For the variable frequency operation the receiving circuit 50 remains unchanged except for the tuning of the frequency filters. The single control signal now has the center frequency 68 positioned as shown in FIG. 13. This frequency can be varied by the external controller (not shown) between frequencies 70 and 72. The series-connected L-C filters 52 and 54 now perform as slope detectors which are tuned to frequencies 74 and 76 respectively, with overlapping characteristic response curves 78 and 80. In the event that the amplitude of the control signal remains constant (for constant speed operation), as the signal frequency approaches for example frequency 74 because of a corresponding steering command, the output 62 of detector 52 increases as prescribed by the response curve 78. Simultaneously, the output 82 of detector 54 decreases as prescribed by the response curve 80. Amplitude variations imposed (externally) on the control signal due to variable speed operation will also appear at the detector outputs 62 and 82, superposed on the steering related amplitude variations.

Frequency assignment is determined by the frequency range between 70 and 72 and the power in the sidebands for that bandwidth. If 70 and 72 are 5 khz apart for example, FIG. 12c shows a practical assignment with the center or carrier frequencies spaced 30 khz at 20 khz, 50 khz, 80 khz, and 110 khz.

With reference to FIG. 9, the vehicle's receiving circuit is shown in block diagram with channels 81 and 83. The control signals and D.C. power are picked up from the track and properly polarized by commutating diodes. The frequency filters isolate the A.C. control signals of the designated frequency from the D.C. component, and attenuate all other control frequencies. The D.C. thus decoupled is connected to the power amplifiers for driving the D.C. motors 82 and 84. The A.C. signal levels, or modulations, are recovered by diode detectors and control the power amplifiers and thus the amount of drive voltage imposed on the D.C. motors 82 and 84.

Figure 8:
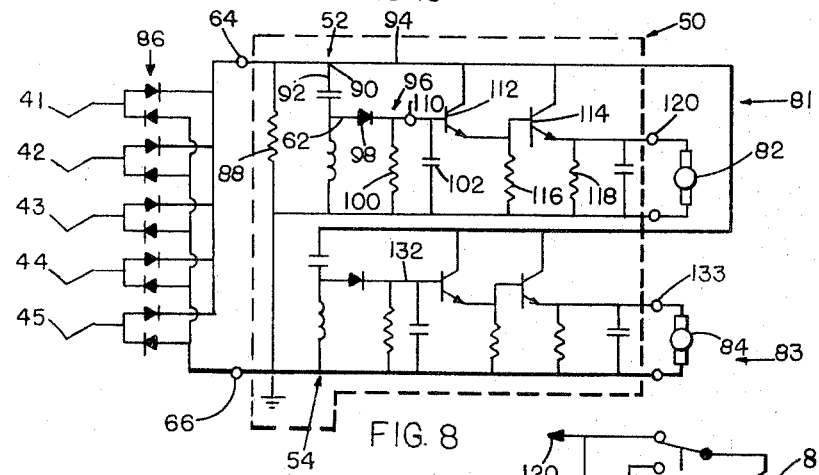
FIG. 8 is a schematic diagram of the basic receiving circuitry

In FIG. 8, the five contacts 41–45 are shown connected to commutating diodes generally at 86. The signals once picked up from the track through the contacts 41–45, properly polarized by the commutating diodes 86 are presented at inputs 64 being positive and 66 being negative. A resistor 88 in parallel with the filters 52 and 54 provides a minimum D.C. load for the commutating diodes 86 thus assuring that there is always a low impedance path available for A.C. control signals even at initial start up when only small currents are flowing. This assures smooth initial acceleration.

The following description of channel 81 applies likewise to channel 83. The control signals and D.C. component are isolated from each other at circuit node 90. The capacitor 56 of filter 52 blocks the D.C. component, permitting only the A.C. control signal to flow through the filter. The composite signal flows into branch 94 where the D.C. component supplies the transistor collector currents. The A.C. control signal of a frequency identical with the resonant frequency of filter 52 is taken off the filter output 62. The filter performs the functions of selection, amplification, etc. described previously.

A level detector generally at 96 comprising a diode 98, a resistor 100 and a capacitor 102 detects the voltage level of the unattenuated control signal of frequency 51 present at output 62 of filter 52. An alternate detector shown in FIG. 14 at 104 comprising additionally a second capacitor 106 and a second diode 108, commonly called a voltage doubler, may be used as a level detector. Both detectors 96 and 104 have an output 110 connected to the base of transistor 112. The signal present at detector output 110 in the case of detector 96 is a D.C. voltage, resulting from half wave rectifying and filtering the output 62 of filter 52. This D.C. voltage at detector output 110 is therefore proportional to the voltage at filter output 62 which is in turn proportional to the amplitude of the control signal of frequency 51. In the case of detector 104 the signal at output 110 is a D.C. voltage double that for detector 96 which may be useful if a larger drive signal for the power amplifier is required.

The transistors 112 and 114 and resistors 116 and 118 comprise a two stage emitter follower power amplifier. The D.C. voltage proportional to the control signal present at output 110 is presented at output 120 less only the constant base to emitter junction voltage drops for each transistor 112 and 114. The D.C. current available at 120 is sufficient to provide drive for the motor 82 limited by the voltage drop across the motor. The capacitor 122 filters out noise spikes generated by the commutating brushes of the motor 82. Thus it can be observed that for a given control voltage at output 120, corresponding to a particular control signal at inputs 64 and 66, the transistor 114 will provide any amount of current up to the limitations of its current carrying capabilities or when properly designed up to the limit of the I R drop of the motor 82 when at a rest. As D.C. motor 82 speeds up it develops back emf, which tends to reduce the current required. Thus, over the operating range the transistor 114 and resistor 118 act as a voltage source thereby utilizing self-regulating current characteristics of the D.C. motor 82.

The receiving circuit 81 in FIG. 8 may be employed in alternate embodiments, for example, one in which steering and speed control are not achieved through the cooperative action of the transducers 82 and 84. The action of the two fixed frequency control signals and the circuit channels would be entirely unrelated and independent: The control signal 51, for example, would uniquely control the vehicle speed, with motor 82 supplying the motive power; the control signal 53 would then uniquely control the vehicle steering via transducer 84 which, in this case, could be a motor actuating a steering mechanism for the unpowered (front) wheels, or it could be a solenoid or similar device which again would so actuate a steering mechanism.

More generally, the circuitry 81 will furnish, in response to a suitable input signal or signals, output voltages which are related to the input as prescribed by the transfer characteristic of circuitry 81 and which can be used to drive a device or devices such as transducers in a cooperative manner in the case of a single variable frequency input signal, or in an independent or cooperative manner in the case of two fixed frequency input signals.

With reference to FIG. 15 and FIG. 16, one modification to the receiving circuit 50 is shown in block diagram form and schematically to provide dynamic braking and reversing or other similar control functions as for example sounding a horn, turning on and off lights, etc. Reversing and braking is accomplished by using a stepping relay 124 to reverse the polarity of current in the D.C. motors 82 and 84. The modification to circuit 50 comprises a differentiator 126, a monostable multivibrator or a one shot 128, a line isolation filter 130, and the stepping relay 124. The reversing circuit 131 is connected to circuit 50 at point 110 or the same point 132 on channel 83 if desired. Connections to input lines 64 and 66 and to circuit 50 are indicated. The relay contacts are connected to points 120, 133 and 64 as indicated.

The external controller sends out a burst of several cycles of the frequency 51, for example. The result is a pulse present at the output 110. The pulse is differentiated into a spike which then triggers the one-shot 128 which in turn drives the stepping relay 124.

The differentiator 126 comprising capacitor 134, and resistor 136 provides only a positive spike since the negative spike is clamped by diode 138. The monostable multivibrator comprises transistors 140 and 142, biasing resistors 144 and 146, feedback current limiting resistor 148, dynamic feedback capacitor 150, collector current limiting resistor 152, damping resistor 154, and coil load 156. Initially transistor 142 is on and transistor 140 is off due to biasing resistor 146 providing current to the base of transistor 142 and biasing resistor 144 holding the base of transistor 140 at ground. When the pulse spike from the differentiator 126 appears at node 158, transistor 140 begins conducting and current flows through coil 156 to activate the relay mechanism 124. Simultaneously the collector of transistor 140 goes to essentially ground potential. The voltage change at the collector of transistor 140 is coupled directly through capacitor 150 to the base of transistor 142, thereby causing it to cease conducting. The voltage at the collector of transistor 142 rises and the voltage thus raised is fed back through resistor 148 to the base of transistor 140 and maintains transistor 140 in the conducting state. This state continues until capacitor 150 charges through resistor 146 and the dynamic feedback is broken to allow the transistors to return to their initial state thereby terminating the activation pulse in coil 156. The filter 130 provides transient protection to the circuit when the car is first placed on the energized track. Lamp 160 is provided to indicate the status of the reversing relay 124. Resistor 154 damps out any reverse voltage spikes appearing across coil 156.

Figure 18:
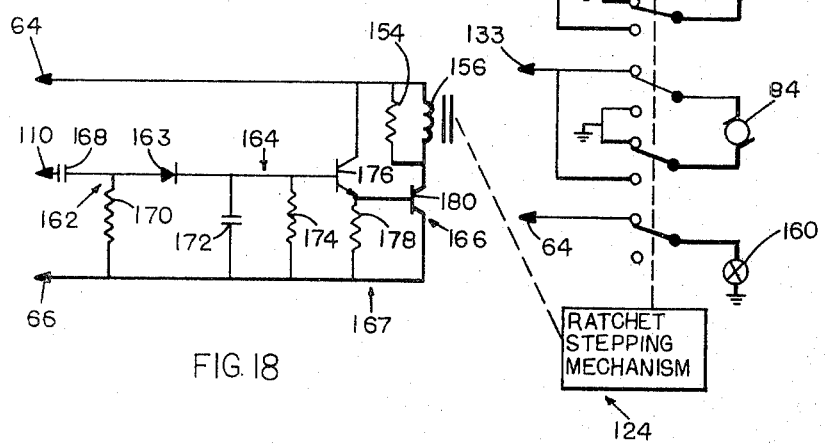
FIG. 18 is a schematic diagram of the amplitude modulation circuit modification used for braking and reversing the vehicle.

With reference to FIGS. 17 and 18 another modification to the receiving circuit 50 is shown. Again a stepping relay 124 is used to reverse motor polarity and a lamp 160 indicates the status. The modification to circuit 50 comprises a high pass filter 162, a rectifier 163 and filter 164, and a transistor switch 166. The reversing circuit 167 is connected to circuit 50 at input lines 64 and 66 and at node 110 or 132 if desired. The relay contacts are connected to points 120, 133 and 64 as indicated.

The external control sends out a slowly modulating sine wave on the carrier frequency 51, for example. The low frequency sine wave detected and present at point 110 is then filtered to remove the lower frequencies associated with change in speed or steering by high pass filter 162 comprising capacitor 168 and resistor 170. The thus filtered sine wave is rectified by diode 163 and filtered to a smooth D.C. level by filter 164 comprising capacitor 172 and resistor 174. The D.C. level present across filter 164 is imposed on the base of transistor 176 causing it to conduct and raising the voltage drop across resistor 178 which in turn causes the voltage on the base of transistor 180 to increase and thereby causes transistor 180 to conduct. When transistor 180 conducts current flows in coil 156 thereby activating the relay mechanism 124. Resistor 154 damps out reverse voltage spikes appearing across the coil. Transistor 180 continues conducting until the slowly modulating signal ceases.

It will be noted that in the circuits in FIGS. 8, 14, 16 and 18 transistors of the NPN type are used throughout, which choice is essentially arbitrary. Transistors of the PNP type may instead be employed, which requires only the reversal of all diodes in the respective circuits. Instead of discrete components (transistors, diodes, resistors). "integrated circuit" devices may be employed which incorporate most of the circuit in a single component.

It is claimed:

1. A track defining a roadbed and having continuous conductors arranged to define spaced, transverse conducting segments of alternate opposite polarity and strips of insulating material positioned between said conducting segments, said conducting segments being adapted to receive superimposed alternating and direct current signals from an external controller means, said track including a plurality of interchangeable sections mechanically and electrically engaged to form a closed roadbed configuration, the opposite ends of each section having complementary construction so that the one end of any section can be connected to the other end of any other section without interrupting the electrical continuity of said conductors, said one end of each section terminating along the edge of one transverse conductor segment and said other end of each section terminating along the edge of said insulating material that is positioned against the other transverse conducting segment.

2. A track as is defined by claim 1, wherein one of said sections is substantially rectangular in shape.

3. A track as is defined by claim 1, wherein one of said sections is substantially arc-like in shape with said continuous conductors arranged to define radially extending conducting segments of alternate opposite polarity, said radially extending conducting segments increasing in width proportionally to the radial distance from the center of a circle defined by said arc-like shape of said section.

* * * * *